US012759429B2

(12) United States Patent
Panchal et al.

(10) Patent No.: US 12,759,429 B2
(45) Date of Patent: Oct. 13, 2026

(54) TECHNIQUES FOR ESTIMATING BATTERY SYSTEM POWER CAPABILITY USING MACHINE LEARNING MODELS AND SEARCH ALGORITHMS

(71) Applicants: FCA US LLC, Auburn Hills, MI (US); McMaster University, Hamilton (CA)

(72) Inventors: Satyam Panchal, Auburn Hills, MI (US); Yasaman Masoudi, Auburn Hills, MI (US); Dipan Arora, Auburn Hills, MI (US); Oliver Gross, Auburn Hills, MI (US); Junran Chen, Hamilton (CA); Phillip Kollmeyer, Hamilton (CA); Carlos Jose Goncalves Vidal, Hamilton (CA); Mina Gamal Naguib Nassim, Hamilton (CA)

(73) Assignee: FCA US LLC, Auburn Hills, MI (US)

( * ) Notice: Subject to any disclaimer, the term of this patent is extended or adjusted under 35 U.S.C. 154(b) by 79 days.

(21) Appl. No.: 18/919,001

(22) Filed: Oct. 17, 2024

(65) Prior Publication Data

US 2026/0109260 A1 Apr. 23, 2026

(51) Int. Cl.
*B60L 58/12* (2019.01)
*G05B 13/02* (2006.01)

(52) U.S. Cl.
CPC ............ *B60L 58/12* (2019.02); *G05B 13/027* (2013.01); *B60L 2240/545* (2013.01); *B60L 2240/547* (2013.01); *B60L 2240/549* (2013.01)

(58) Field of Classification Search
CPC ............... B60L 58/12; B60L 2240/545; B60L 2240/547; B60L 2240/549; G05B 13/027
USPC ........................................................... 701/22
See application file for complete search history.

(56) References Cited

U.S. PATENT DOCUMENTS

| | | | | |
|---|---|---|---|---|
| 7,321,220 | B2 | 1/2008 | Plett | |
| 9,197,078 | B2 | 11/2015 | Lee | |
| 9,321,368 | B2 * | 4/2016 | Yang | G01R 31/3647 |
| 9,878,632 | B2 | 1/2018 | Zhou et al. | |
| 10,099,679 | B2 * | 10/2018 | Wang | B60W 20/13 |
| 11,897,364 | B1 * | 2/2024 | Hu | B60L 58/16 |

(Continued)

FOREIGN PATENT DOCUMENTS

| | | | |
|---|---|---|---|
| CN | 105301509 | A | 2/2016 |
| CN | 108845273 | A | 11/2018 |

(Continued)

OTHER PUBLICATIONS

Ranzato et al., "Sequence Level Training with Recurrent Neural Networks", 2016, arXiv:1511.06732. (Year: 2016).*

(Continued)

*Primary Examiner* — Krishnan Ramesh
(74) *Attorney, Agent, or Firm* — Jeremy J. Klobucar

(57) ABSTRACT

A state of power (SOP) estimation system for an electrified vehicle includes a battery system of the electrified vehicle and a control system configured to access a trained battery voltage estimation model configured to estimate a voltage of the battery system based on a set of input parameters including at least state of charge (SOC), temperature, and power or current, perform a search process to determine a final estimated SOP that causes the estimated voltage of the battery system to fall within a desired voltage range, and control the electrified vehicle based on the final estimated SOP of the battery system.

20 Claims, 7 Drawing Sheets

(56) References Cited

U.S. PATENT DOCUMENTS

| | | | | |
|---|---|---|---|---|
| 2006/0091861 | A1* | 5/2006 | Melichar | B60L 58/12 320/132 |
| 2012/0101674 | A1* | 4/2012 | Wang | G01R 31/367 903/903 |
| 2019/0080526 | A1* | 3/2019 | Shin | G07C 5/085 |
| 2021/0237614 | A1* | 8/2021 | Yao | B60L 15/20 |
| 2022/0212545 | A1* | 7/2022 | Araujo Xavier | B60L 15/20 |
| 2022/0283235 | A1* | 9/2022 | Uoshima | G01R 31/388 |
| 2023/0219458 | A1* | 7/2023 | Altaf | B60L 3/0046 320/126 |
| 2023/0322122 | A1 | 10/2023 | Altaf et al. | |
| 2023/0356623 | A1* | 11/2023 | Araujo Xavier | B60L 58/12 |
| 2023/0393209 | A1* | 12/2023 | Dangwal | G01R 31/3842 |
| 2023/0406109 | A1 | 12/2023 | Holme | |
| 2024/0149742 | A1* | 5/2024 | Yao | B60L 3/0046 |
| 2024/0385249 | A1* | 11/2024 | Choi | G01R 31/367 |
| 2025/0060413 | A1* | 2/2025 | Chen | G01R 31/367 |
| 2025/0164565 | A1* | 5/2025 | Zhang | G01R 31/3828 |
| 2025/0214445 | A1* | 7/2025 | Tanaka | B60L 15/20 |
| 2025/0294375 | A1* | 9/2025 | Soldati | H04W 24/02 |

FOREIGN PATENT DOCUMENTS

| | | | | | |
|---|---|---|---|---|---|
| CN | 109061520 | A | | 12/2018 | |
| CN | 109116254 | A | * | 1/2019 | |
| CN | 110196393 | A | | 9/2019 | |
| CN | 117549797 | A | * | 2/2024 | B60L 58/12 |

OTHER PUBLICATIONS

English translation of CN117549797, accessed Feb. 2026. (Year: 2026).*

English translation of CN109116254, accessed Feb. 2026 (Year: 2026).*

* cited by examiner

TECHNIQUES FOR ESTIMATING BATTERY SYSTEM POWER CAPABILITY USING MACHINE LEARNING MODELS AND SEARCH ALGORITHMS

FIELD

The present application generally relates to electrified vehicles and, more particularly, to techniques for estimating battery system power capability using machine learning models and search algorithms.

BACKGROUND

An electrified vehicle includes a high voltage battery system configured to output electrical energy (i.e., current and voltage) to power one or more electric motors, such as for vehicle propulsion. State of power (SOP) is a metric of a battery system that represents a maximum amount of power that the battery system can absorb or release for a specific length of time. Battery system SOP is thus a critical metric for high power applications such as electrified vehicles. If the battery system SOP is over-estimated, it could result in a system malfunction due to safe operating limits being exceeded and, in extreme cases, could potentially result in reduced battery life, thermal runaway, and/or other damage (e.g., overloading) and thereby increased replacement or warranty costs. If the battery system SOP is underestimated, the battery power will be unnecessarily limited and negatively impact performance (response, vehicle range, etc.). While conventional battery system SOP estimation techniques do work for their intended purpose, there exists an opportunity for improvement in the relevant art.

SUMMARY

According to one example aspect of the invention, a state of power (SOP) estimation system for an electrified vehicle is presented. In one exemplary implementation, the SOP estimation system comprises a battery system of the electrified vehicle and a control system configured to access a trained battery voltage estimation model configured to estimate a voltage of the battery system based on a set of input parameters including at least state of charge (SOC), temperature, and power or current, perform a search process to determine a final estimated SOP that causes the estimated voltage of the battery system to fall within a desired voltage range, and control the electrified vehicle based on the final estimated SOP of the battery system.

In some implementations, the trained battery voltage estimation model is a long short-term memory (LSTM) based recurrent neural network model. In some implementations, the search process is a binary search process. In some implementations, the trained battery voltage estimation model is obtained by training a battery voltage estimation model using a sequence training process. In some implementations, the trained battery voltage estimation model includes two hidden LSTM layers each having sixteen hidden units.

In some implementations, the search process is a binary search process. In some implementations, the trained battery voltage estimation model is obtained by training a battery voltage estimation model using a sequence training process. In some implementations, the training using the sequence training process enables the battery voltage estimation model to be trained from a discontinuous dataset, which thereby increases an accuracy of the battery voltage estimation model.

In some implementations, the search process includes, for each iteration: applying a different power pulse to the trained battery voltage estimation model to determine an estimated voltage of the battery system, determine whether the estimated voltage of the battery system falls within the desired voltage range corresponding to an acceptable error tolerance, and when the estimated voltage of the battery system does not fall within the desired voltage range, increasing or decreasing the power pulse for a next iteration. In some implementations, the control system is not configured to utilize, for SOP estimation of the battery system, either (i) a characteristic mapping method or (ii) an equivalent circuit model (ECM) or electrochemical model for the battery system.

According to another example aspect of the invention, an SOP estimation method for an electrified vehicle is presented. In one exemplary implementation, the SOP estimation method comprises accessing, by a control system of the electrified vehicle, a trained battery voltage estimation model configured to estimate a voltage of a battery system of the electrified vehicle based on a set on input parameters including at least SOC, temperature, and power or current, performing, by the control system, a search process to determine a final estimated SOP that causes the estimated voltage of the battery system to fall within a desired voltage range, and controlling, by the control system, the electrified vehicle based on the final estimated SOP of the battery system.

In some implementations, the trained battery voltage estimation model is an LSTM-based recurrent neural network model. In some implementations, the search process is a binary search process. In some implementations, the trained battery voltage estimation model is obtained by training a battery voltage estimation model using a sequence training process. In some implementations, trained battery voltage estimation model includes two hidden LSTM layers each having sixteen hidden units.

In some implementations, the search process is a binary search process. In some implementations, the trained battery voltage estimation model is obtained by training a battery voltage estimation model using a sequence training process. In some implementations, the training using the sequence training process enables the battery voltage estimation model to be trained from a discontinuous dataset, which thereby increases an accuracy of the battery voltage estimation model.

In some implementations, the search process includes, for each iteration: applying a different power pulse to the trained battery voltage estimation model to determine an estimated voltage of the battery system, determine whether the estimated voltage of the battery system falls within the desired voltage range corresponding to an acceptable error tolerance, and when the estimated voltage of the battery system does not fall within the desired voltage range, increasing or decreasing the power pulse for a next iteration. In some implementations, the control system is not configured to utilize, for SOP estimation of the battery system, either (i) a characteristic mapping method or (ii) an ECM or electrochemical model for the battery system.

Further areas of applicability of the teachings of the present application will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present application are intended to be within the scope of the present application.

DESCRIPTION

Figure 1:
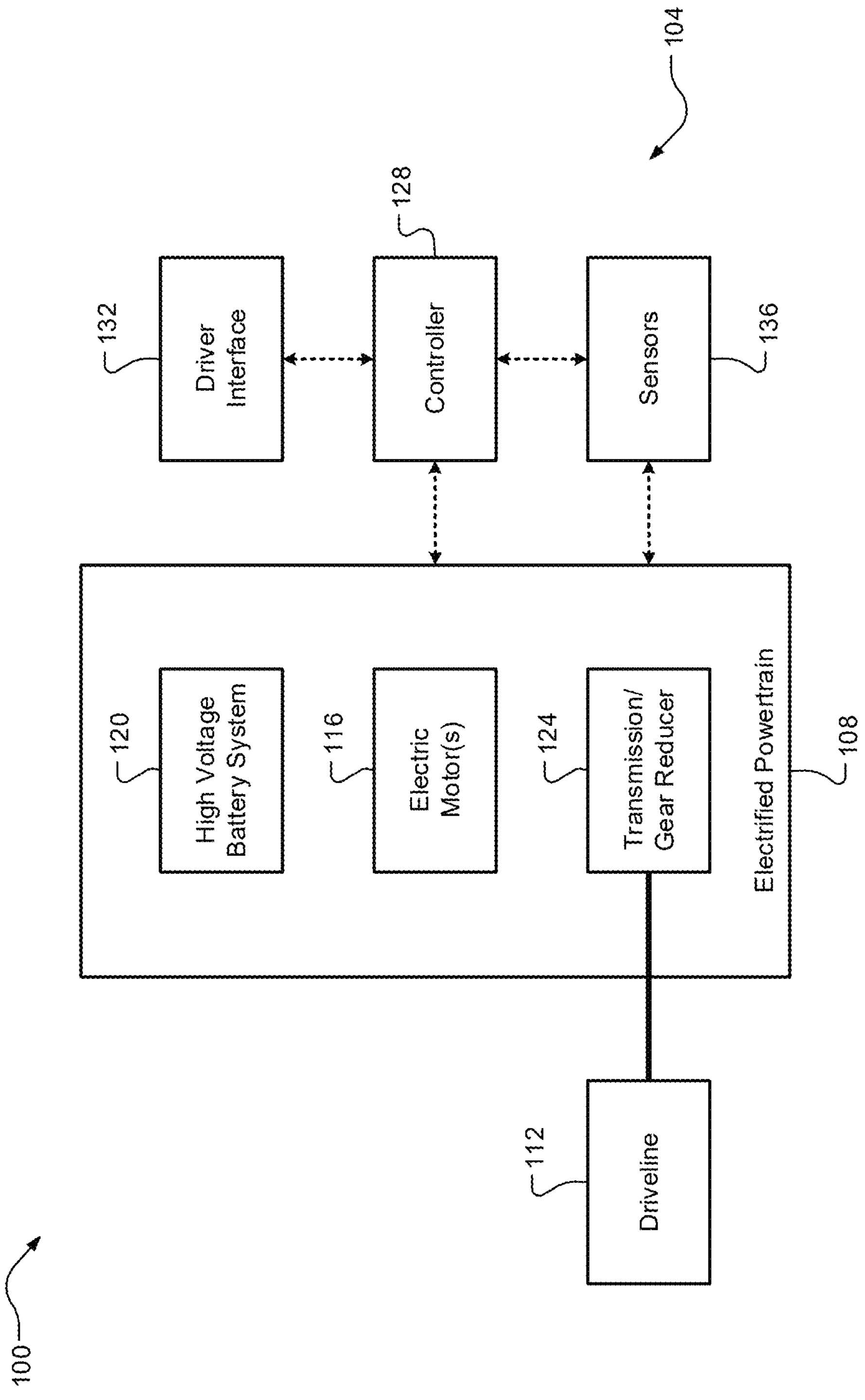
FIG. 1 illustrates a functional block diagram of an electrified vehicle having an example battery state of power (SOP) estimation system according to the principles of the present application.

As previously discussed, battery system state of power (SOP) is a critical metric for high power applications such as electrified vehicles. If the battery system SOP is overestimated, it could result in a system malfunction due to safe operating limits being exceeded and, in extreme cases, could potentially result in reduced battery life, thermal runaway, and/or other damage (e.g., overloading) and thereby increased replacement or warranty costs. If the battery SOP is underestimated, the battery power will be unnecessarily limited and negatively impact performance (response, vehicle range, etc.). Unfortunately, battery system SOP cannot be measured directly using sensors like other parameters (current, voltage, temperature, etc.). Thus, a battery model-based algorithm is required to estimate SOP during battery system operation. Conventional methods rely on equivalent circuit models or electrochemical models, which require in-depth knowledge and characterization test data for precise modeling and still may not achieve satisfactory accuracy. These conventional SOP estimation techniques will now be discussed in greater detail.

The most straightforward SOP estimation algorithm is characteristic mapping developed from a battery characterization test. Characteristic mapping states the relation between battery SOC, voltage, temperature, power pulse duration, and power capability. This map is stored in the BMS and called every time step during battery operation. A typical method to generate this map is the hybrid pulse power characterization (HPPC) test. More advanced SOP estimation approaches are based on dynamic battery models, and the most common approaches among them are battery equivalent circuit model (ECM) based methods. Based on the open circuit voltage resistance (OCV-R) battery model, direct SOP estimation methods provide a fast and accurate estimation of maximum power considering operational-related constraints. In cases where the power pulse duration is short (e.g., 1 second), a simple OCV-R model is typically sufficient for SOP estimation since the longer term dynamics of the battery do not have an impact over this brief period. However, for power pulses of greater length, accurate predictions become challenging due to the time-dependent, nonlinear dynamics of lithium-ion batteries. Therefore, equivalent circuit models (ECMs) with one or more resistor capacitor (RC) pairs and current-dependent resistance values, are applied with iterative algorithms to predict the SOP. For potentially higher estimation accuracy and a more in-depth understanding of the internal electrochemical processes, electrochemical models are applied to estimate battery SOP at the cost of higher computing power.

While the characteristic mapping method is straightforward to implement, it has limitations that impact the accuracy of SOP prediction. Firstly, it ignores the effect of various electrochemical processes, which can lead to low accuracy. Additionally, it requires a significant amount of memory storage to maintain extensive battery state information to ensure accuracy. Furthermore, addressing the uncertainty of parameters arising from battery degradation is challenging, resulting in a gradual decline in SOP estimation accuracy over years of usage. Conventional SOP estimation methods based on dynamic battery models, such as ECMs or electrochemical models, incorporate battery chemical processes, including polarization and resistance hysteresis. This incorporation theoretically results in higher estimation accuracy than the characteristic mapping method. However, both ECM-based and electrochemical model-based SOP estimation methods have their limitations. For the ECM-based method, it cannot provide detailed physical insight into the internal electrochemical processes, which can be vital for accurately estimating SOP. The electrochemical model-based method covers the dynamics of internal electrochemical states, e.g., electrode surface concentration, electrolyte concentration, and side-reaction over-potential. It thus offers massive potential in ensuring accurate SOP estimation. However, implementing such a complex model in real-time applications remains challenging without additional techniques to enhance efficiency.

Accordingly, improved machine-learning based battery system SOP estimation techniques are presented herein. These techniques utilize a machine learning-based battery modeling technique and binary searching for SOP estimation. The techniques can be generally divided into two parts: (1) a long short-term memory (LSTM) network-based battery voltage estimation model, whose inputs include measured SOC, temperature, and power, and may include different inputs if needed, and (2) a binary search process to determine battery SOP from the model. While an LSTM network based model is proposed herein, it will be appreciated that another suitable neural network based model could also be utilized. Additionally, there are numerous alternatives to the binary search algorithm described herein, which can be utilized to determine SOP from the model. The LSTM network based model provides various benefits, which are discussed in greater detail herein. Potential benefits of the battery system SOP estimation techniques of the present application include more accurate SOP estimation (e.g., compared to the conventional SOP estimation techniques described above) and thus improved electrified vehicle performance (response, range, etc.) and avoiding the other above-described drawbacks of inaccurate SOP estimation (i.e., under-estimation and overestimation).

A key innovation of the proposed techniques is substituting the battery voltage estimation model's input parameter from current, the more conventional approach, to power. This alteration eliminates the need for an additional iteration loop to calculate the battery current needed to achieve the power command at each time step, thereby reducing computation requirements by a factor of five or more. The accuracy of this algorithm could not have been achieved without the presented sequence training method, whose application to battery voltage estimation is a new contribution as well. Additionally, a novel battery SOP binary search process is proposed. This process iteratively searches SOP by applying virtual power pulses to the battery model and updating next-step power according to the model response. Other conventional techniques employ constant current pulses instead of constant power pulses to battery models virtually and subsequently calculate battery SOP by multiplying the calculated maximum current by the estimated average or end-time voltage. However, such an approach can introduce errors in the estimation since SOP is defined on constant power pulses.

Referring now to FIG. 1, a functional block diagram of an electrified vehicle 100 having an example battery SOP estimation system 104 (e.g., a computing device plus sensors) according to the principles of the present application is illustrated. The electrified vehicle 100 (also "vehicle 100") generally comprises an electrified powertrain 108 configured to generate and transfer drive torque to a driveline 112 for vehicle propulsion. The electrified powertrain 108 includes, for example, one or more electric motors 116 (e.g., a three-phase traction motor) configured to generate drive torque using electrical energy (current) provided by a high voltage battery pack or system 120. The drive torque is transferred from the electric motor(s) 116 to the driveline 112 via a transmission or gear reducer 124. It will be appreciated that the electrified powertrain 108 could include other non-illustrated components, such as an internal combustion engine configured to combust a fuel/air mixture to generate mechanical energy, which could be used for propulsion and/or converted to electrical energy (current and voltage) for recharging the battery system 120. The operation of the electrified vehicle 100 is controlled by a controller or control system 124.

This control of the electrified vehicle 100 primarily includes controlling the electrified powertrain 108 to generate a desired amount of drive torque to satisfy a driver torque request provided via a driver interface 128 (e.g., an accelerator pedal). While a single controller or control system 124 is shown, it will be appreciated that the electrified vehicle 100 likely includes a plurality of different controllers or control modules (e.g., a battery pack control module, or BPCM) arranged in a desired control architecture and connected via a controller area network (CAN). The control system 124 is also configured to receive measurements from a set of sensors 132 that are configured to monitor various operating parameters of the electrified powertrain 108, including, but not limited to, speeds, torques, temperatures, pressures, and electrical parameters (voltages, currents, etc.). In one exemplary implementation, the control system 124 and the set of sensor(s) 132 collectively form the SOP estimation system 104 of the present application and thus are configured to perform the various functionalities, including the LSTM model and binary search for SOP estimation, described herein and in greater detail below.

Figure 2:
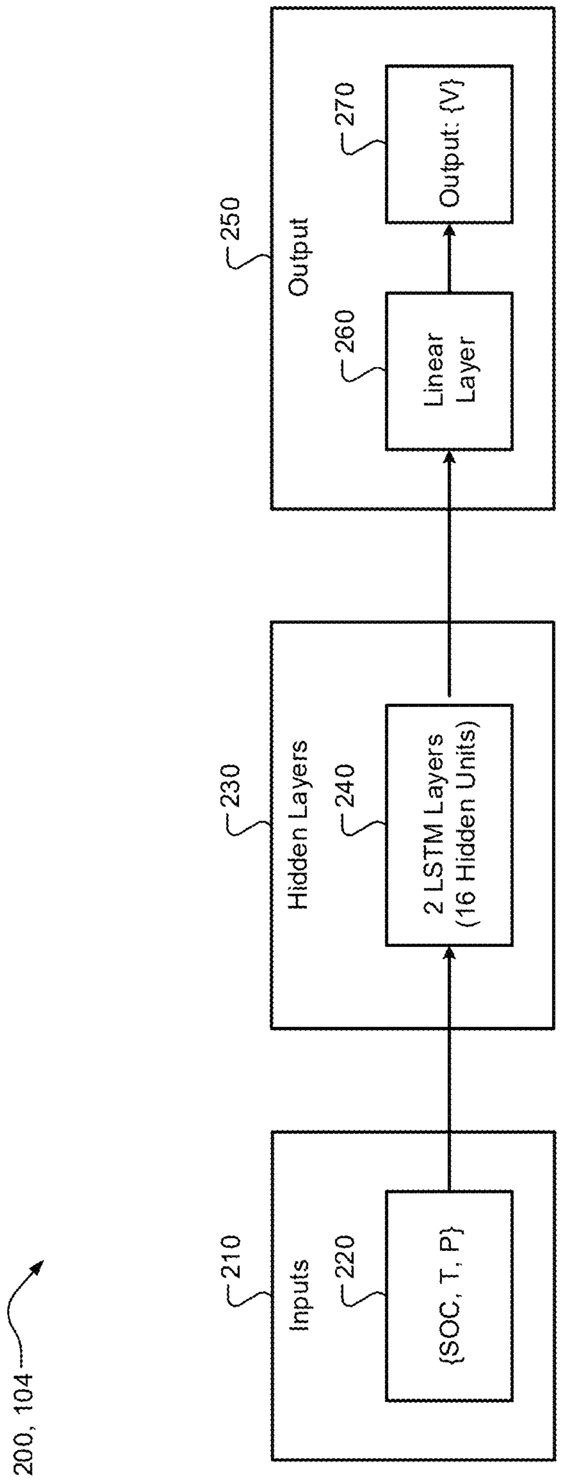
FIG. 2 illustrates a functional block diagram of an example structure of a long short-term memory (LSTM) battery voltage estimation model according to the principles of the present application.

Referring now to FIG. 2, a functional block diagram of an example architecture 200 for the battery SOP estimation system 104 of FIG. 1 according to the principles of the present application is illustrated. Given the similarity between the process for calculating SOP for charging and discharging, only the discharge SOP case is described herein for the sake of conciseness and simplicity, but the techniques are applicable to both charging and discharging cases. The LSTM model is a recurrent neural network model, which has been shown to achieve better accuracy than ECM and electrochemical battery voltage estimation models. The example architecture 200 illustrates one exemplary implementation of the LSTM-based battery voltage estimation model, comprising 2 LSTM layers 230, 240, each equipped with 16 hidden units. The inputs 210 in this example include state of charge (SOC), power (P), and temperature (T), collectively referenced as 220, and the output 250 includes a linear layer 260 and voltage (V), referenced as 270. It will be appreciated that this is merely one example configuration for the LSTM model 200 that the optimal inputs and number of LSTM layers and hidden units could differ depending on the specific battery dataset. Therefore, these hyperparameters serve as illustrative examples rather than fixed values. The training data used in this work are vehicle drive cycle test data, including, but not limited to, UDDS, US06, LA92, and HWFET drive cycles. In one exemplary implementation, the SOP measurement test data shown and discussed herein is conducted on a Samsung® 30T 21700 cylindrical cell battery with lithium nickel manganese cobalt oxide (Li-NMC) chemistry (e.g., rated at 3000 milli-amp-hours, or mAh, and 35A). These tests are conducted at six different temperatures, ranging from −20° Celsius (C) to 40° C.

Figure 3A:
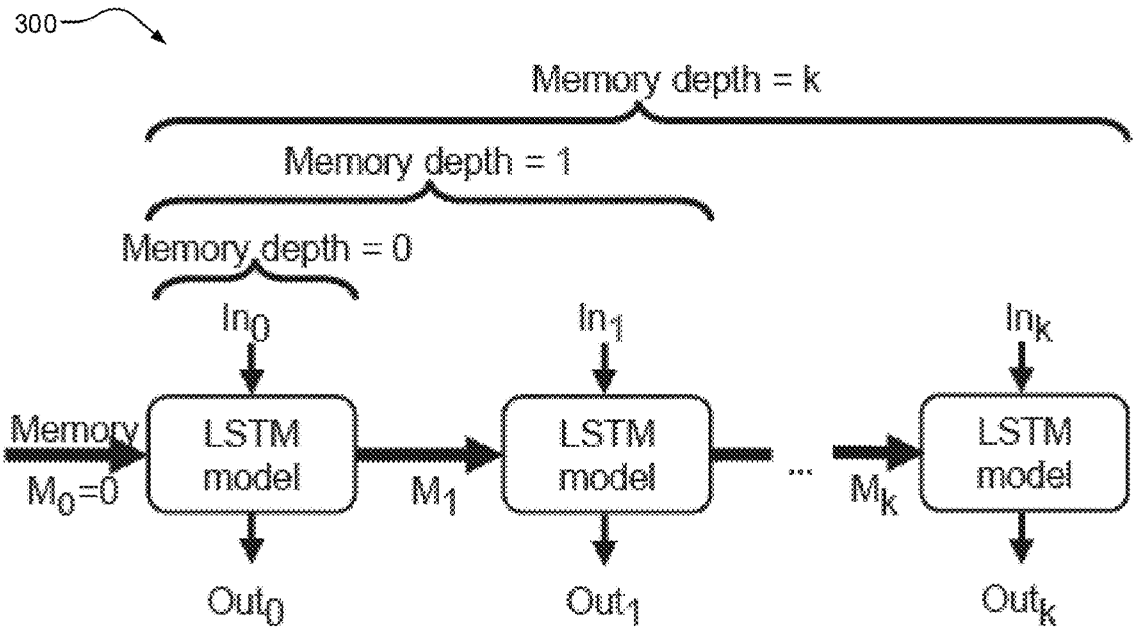
FIGS. 3A-3B illustrate example trainings of the LSTM battery voltage estimation model using continuous data and sequence data according to the principles of the present application.
Figure 3B:
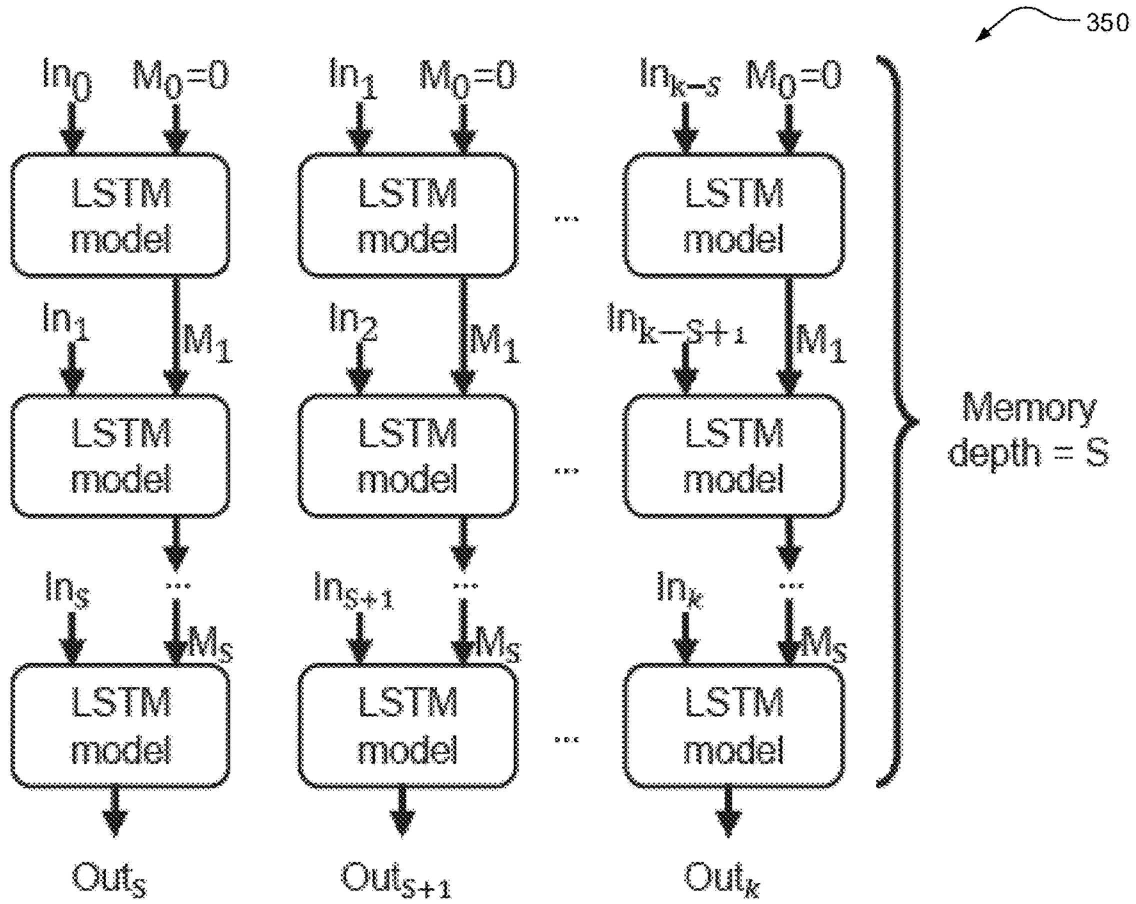

Referring now to FIGS. 3A-3B, example trainings 300, 350 of the LSTM model using continuous data and sequence data, respectively, according to the principles of the present application are illustrated. Viewing these example trainings 300, 350 side-by-side allows for comparison of an LSTM model trained with continuous data and with sequence data (i.e., data with fixed memory depth). Sequence training, in particular, significantly improves the performance of the proposed SOP estimation algorithm. In FIG. 3A, the training 300 of an LSTM model using a full batch of continuous data is shown, where LSTM memory captures past information by running through the entire dataset. The depth of LSTM memory will accumulate as the LSTM model advances to the subsequent time steps. The entire training dataset needs to be time-series consistent and clean to ensure that the LSTM model can gain the ability to refine and pass information related to voltage properly. In FIG. 3B, on the other hand, the training 350 of an LSTM using sequences is shown.

In contrast to training 300 with the entire continuous dataset (FIG. 3A), this training 350 feeds a fixed window (sequence) of prior data (e.g., 100 seconds) into the LSTM at each time step to initialize the memory states properly and then only uses the output at the current time step. With this training strategy, the LSTM just requires the prior data sequence to be continuous; therefore, each training point is isolated from others. Sequence training (e.g., training 350) opens up various machine learning techniques that cannot be conducted with continuous training (e.g., training 300), including data shuffling and mini-batch training. Thus, it enables LSTM to be trained from a discontinuous dataset. Considering inconsistency and outliers commonly existing in the dataset, sequence training significantly improves the accuracy of the LSTM-based voltage estimation model compared to continuous training. Furthermore, sequence training allows the LSTM to just be trained only on portions of the training data, such as the highest power portions, improving the accuracy under the conditions that are most important for the accuracy of the SOP estimator.

Figure 4:
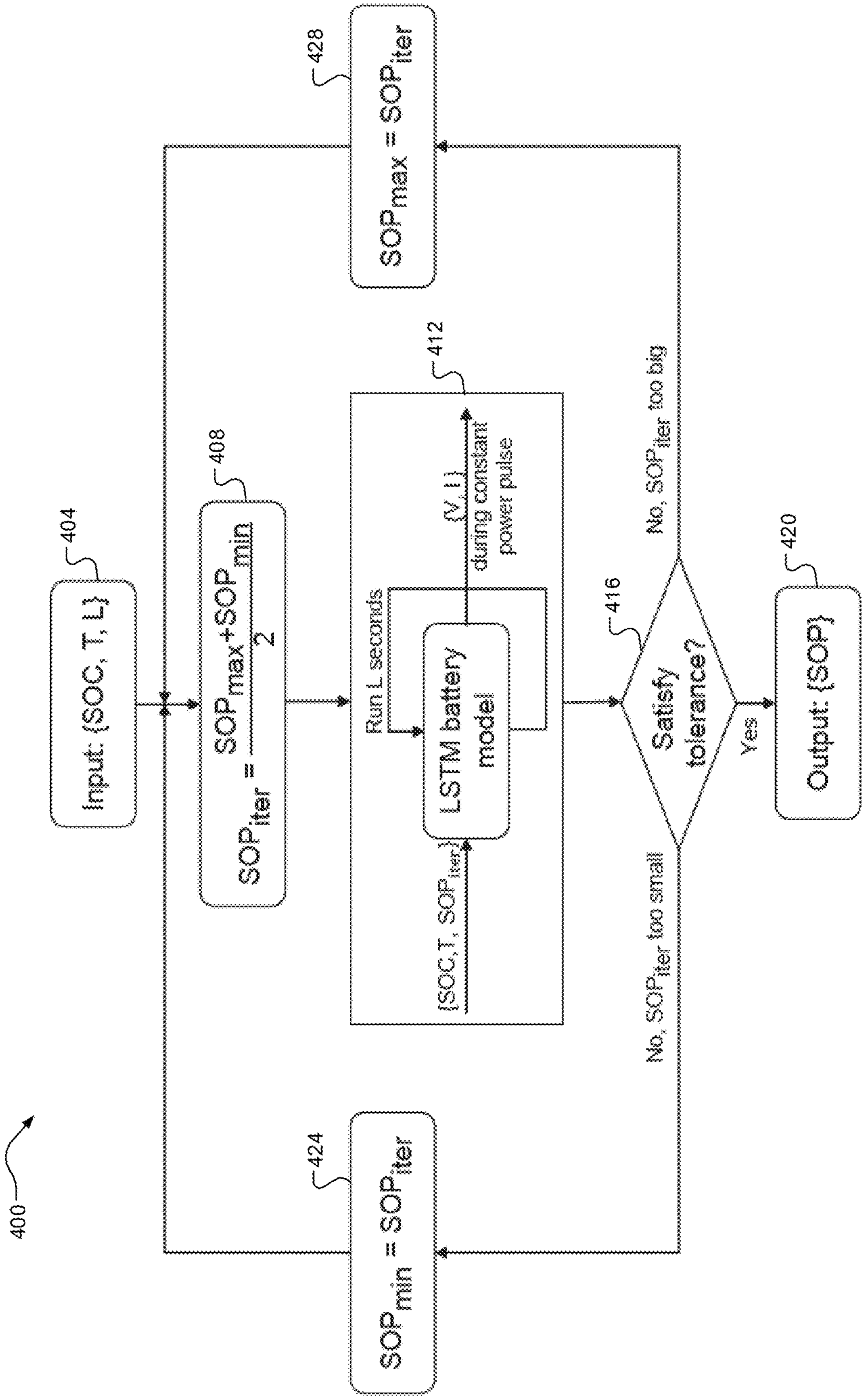
FIG. 4 illustrates a flow diagram of an example SOP estimation method for an electrified vehicle including a binary search process according to the principles of the present application.

Referring now to FIG. 4, a flow diagram of an example SOP estimation method 400 for an electrified vehicle including a binary search process according to the principles of the present application is illustrated. The method 400 begins at 404 with inputs including SOC, T, and a power pulse length (L). For each iteration, the virtual power command $SOP_{iter}$ is applied as a constant power pulse of L length (e.g., 10 seconds) to the LSTM battery model. At 408, the first iteration $SOP_{iter}$ value is calculated from the initial $SOP_{max}$ and $SOP_{min}$ values, where for the discharge case $SOP_{max}$ is a negative value which is slightly greater than the maximum possible discharge power (e.g. −200 watts (W), if maximum possible discharge power is −195W). For the discharge case, $SOP_{max}$ can also be calculated as the product of the maximum discharge current and the maximum voltage (e.g., 50A*4.2V=−210W) since there is no way the discharge power can exceed this value. The $SOP_{min}$ value for the discharge case is 0W because a positive power is defined as charging.

At 412, the LSTM battery model then estimates battery voltage and current response based on the SOC, temperature, and $SOP_{iter}$ inputs. At 416, the "Satisfy Tolerance" logical judgment block then compares the estimated voltage and current at the last time step of the pulse with the preset voltage and current limits. If the difference between the estimated voltage and current and the corresponding limits is within the error tolerance, then the method 400 proceeds to 428 where $SOP_{iter}$ will be output as the final SOP estimate for the corresponding SOC and temperature level and the method 400 ends. Otherwise, if the $SOP_{iter}$ is too small (i.e., the estimated current is smaller than limit, or the estimated voltage is higher than limit), the method 400 proceeds to 424 where the minimum power $SOP_{min}$ will be updated to $SOP_{iter}$, and the new higher $SOP_{iter}$ value will be recalculated using the binary search method 400. The same logic applies if the SOP exceeds a certain limit (see step 428). This iterative search process terminates only when an SOP value that satisfies the error tolerances is achieved at 416 and the value of $SOP_{iter}$ is finally output.

Figure 5:
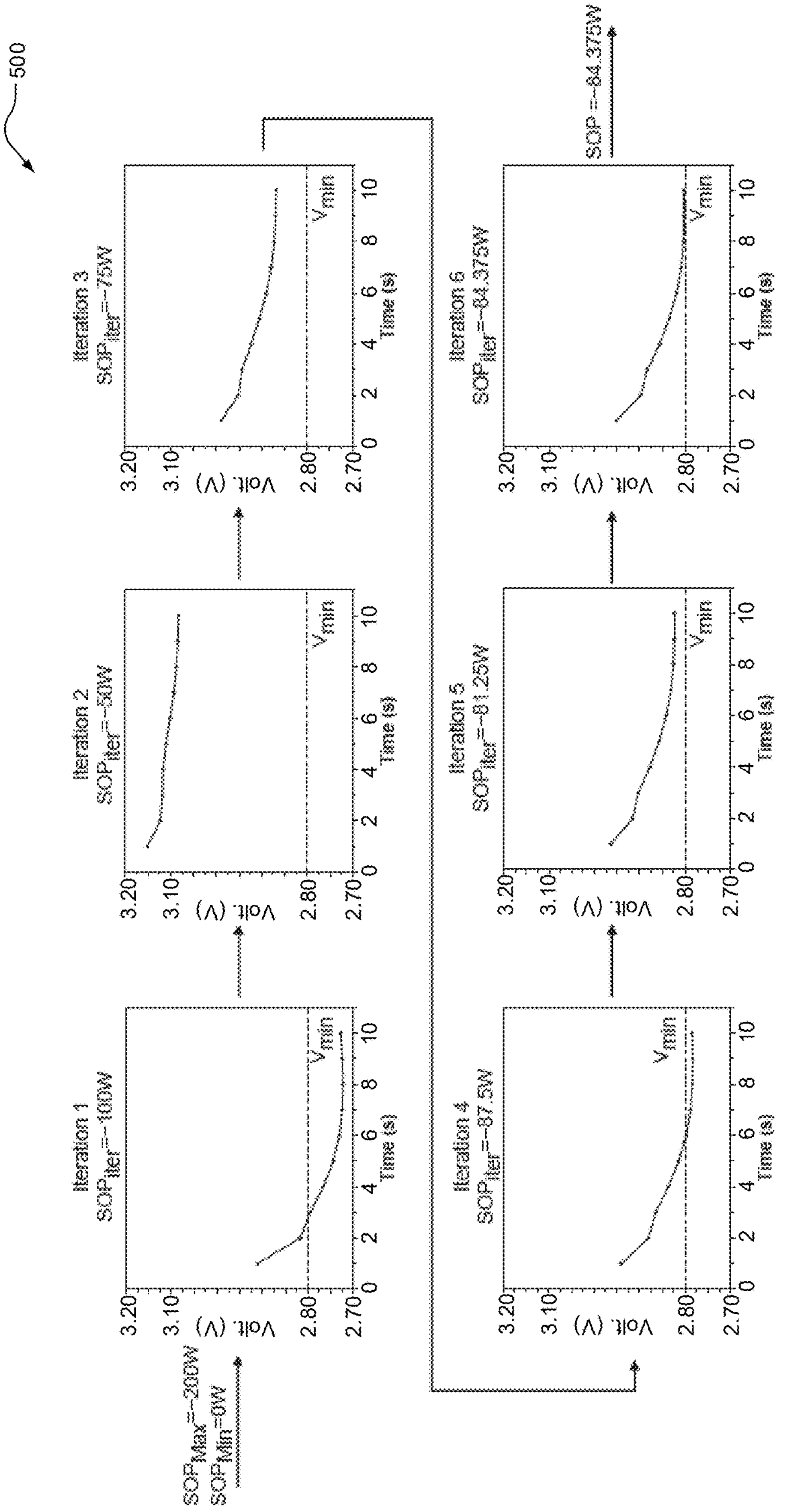
FIG. 5 illustrates example iterations of the binary search process of for the example SOP estimation method of FIG. 4 according to the principles of the present application.

Referring now to FIG. 5, example iterations 500 of the binary search process of for the example SOP estimation method 400 of FIG. 4 according to the principles of the present application are illustrated. As previously mentioned, while binary search is specifically described herein, it will be appreciated that other search algorithms could be utilized (e.g., other iterative search techniques). In this scenario, the SOP is constrained by a minimum voltage threshold, denoted as $V_{min}$, therefore only voltage response to the constant power pulses are presented. In the first iteration, a −100W initial constant power pulse is applied to the LSTM battery model, and the modeled voltage falls below the minimum limit. $SOP_{iter}$ is therefore too big, so $SOP_{max}$ is set to −100W and the next $SOP_{iter}$ value is calculated as −100W plus 0W divided by two equals −50W. This $SOP_{iter}$ power command of −50W is then applied to the model in the second iteration, and the process is repeated. After the six iterations 500, the voltage response narrows down to within an error tolerance of 0.005V from the voltage limit at the final time step of the power pulse. Consequently, the search process is terminated, and the algorithm outputs an estimated SOP value of −84.375W.

Figure 6:
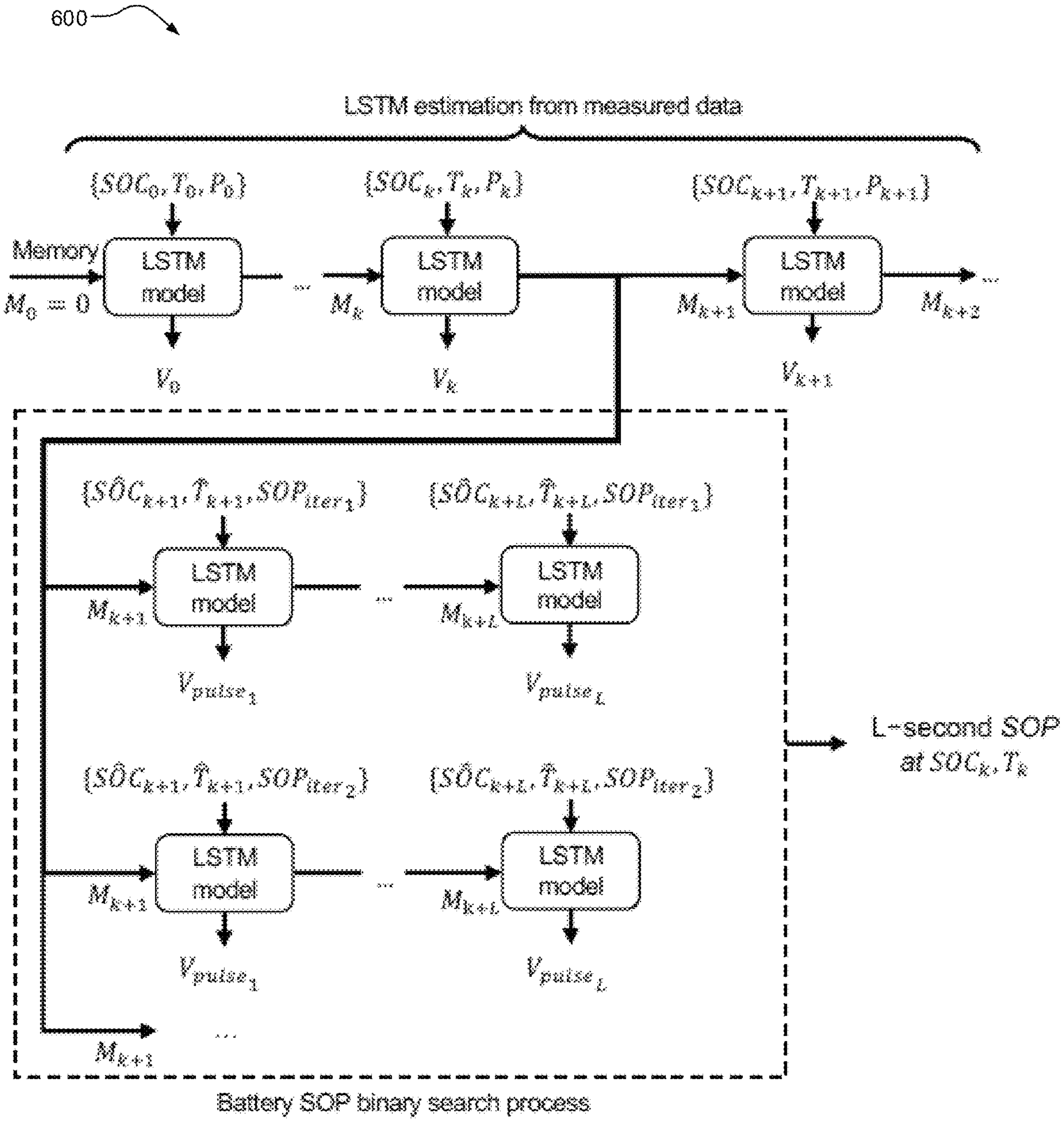
FIG. 6 illustrates example LSTM model data and state flow during an example SOP estimation process according to the principles of the present application.

Referring now to FIG. 6, example LSTM model data and state flow 600 during an example SOP estimation process according to the principles of the present application is illustrated. While estimating SOP in a real-time application, the LSTM model estimates battery voltage from measured data (i.e., SOC, temperature, and power) at each time step in order to capture the battery's operational history in the LSTM memory states. Whenever battery power capability calculation is required (i.e., time step k in FIG. 6), the SOP binary search process is then conducted on the LSTM model with the present memory states (as indicated by Mk+1 in the example). The LSTM memory is reset to the Mk+1 state after estimating each constant power pulse response during the SOP binary search process. After power capability calculation, the LSTM model resumes tracking battery voltage based on the measured data. It is important to note that the power pulses applied are virtual and do not directly affect the battery, so the updated memory states during the SOP binary search process are discarded. The constant power pulse length L is a predefined value according to the user's input (e.g., 2, 10, 30 seconds). To further increase the accuracy of the predicted SOP pulse responses, the SOC value at each time step during the power pulse can be calculated as $SOC_{k+1}$~$SOC_{k+L}$ according to the capacity depletion during the constant power pulse. Meanwhile, a battery thermal model can be applied to calculate battery temperature as $T_{k+1}$~$T_{k+L}$ considering the heat generated from the constant power pulse.

Figure 7:
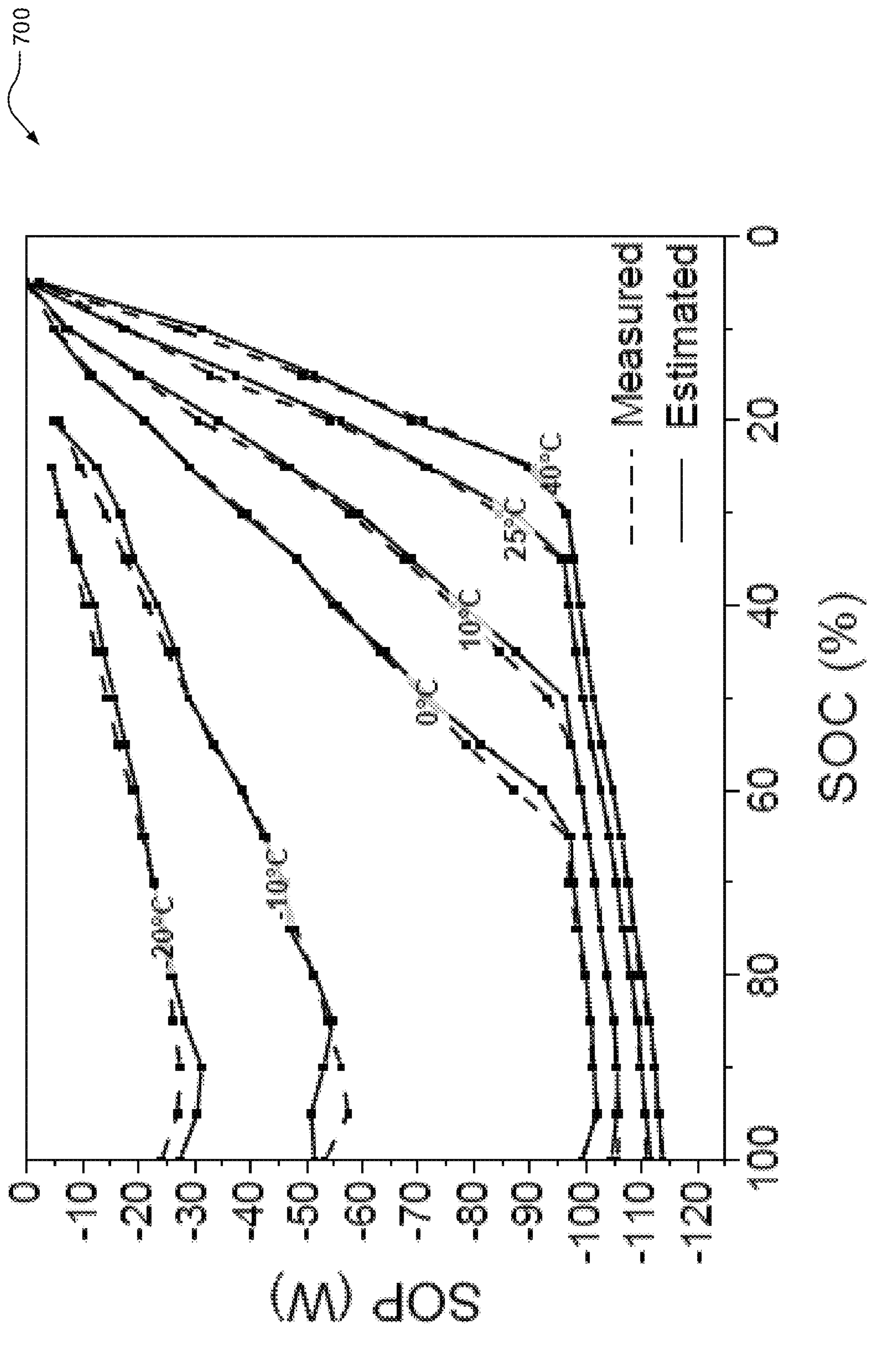
FIG. 7 illustrates a plot showing a comparison between estimated and measured ten-second discharging SOP at six different temperatures according to the principles of the present application.

Referring now to FIG. 7, a plot 700 showing a comparison between estimated and measured ten-second discharging SOP at six different temperatures according to the principles of the present application is illustrated. As noted before, this test data is for a Samsung® 30T 21700 NMC cylindrical battery cell. These results prove that the proposed SOP estimation algorithm performs excellently, even at low temperatures and low SOC conditions where the battery has significant nonlinear characteristics, which are difficult to capture with conventional equivalent circuit based approaches to determining SOP.

It will be appreciated that the terms "controller" and "control system" as used herein refer to any suitable control device or set of multiple control devices that is/are configured to perform at least a portion of the techniques of the present application. Non-limiting examples include an application-specific integrated circuit (ASIC), one or more processors and a non-transitory memory having instructions stored thereon that, when executed by the one or more processors, cause the controller to perform a set of operations corresponding to at least a portion of the techniques of the present application. The one or more processors could be either a single processor or two or more processors operating in a parallel or distributed architecture.

It should also be understood that the mixing and matching of features, elements, methodologies and/or functions between various examples may be expressly contemplated herein so that one skilled in the art would appreciate from the present teachings that features, elements and/or functions of one example may be incorporated into another example as appropriate, unless described otherwise above.

What is claimed is:

1. A state of power (SOP) estimation system for an electrified vehicle, the SOP estimation system comprising:

a battery system of the electrified vehicle; and a control system configured to:

access a trained battery voltage estimation model configured to estimate a voltage of the battery system based on a set of input parameters including at least state of charge (SOC), temperature, and power or current;

perform a search process to determine a final estimated SOP that causes the estimated voltage of the battery system to fall within a desired voltage range; and control the electrified vehicle based on the final estimated SOP of the battery system.

2. The SOP estimation system of claim 1, wherein the trained battery voltage estimation model is a long short-term memory (LSTM) based recurrent neural network model.

3. The SOP estimation system of claim 2, wherein the search process is a binary search process.

4. The SOP estimation system of claim 3, wherein the trained battery voltage estimation model is obtained by training a battery voltage estimation model using a sequence training process.

5. The SOP estimation system of claim 4, wherein the trained battery voltage estimation model includes two hidden LSTM layers each having sixteen hidden units.

6. The SOP estimation system of claim 1, wherein the search process is a binary search process.

7. The SOP estimation system of claim 1, wherein the trained battery voltage estimation model is obtained by training a battery voltage estimation model using a sequence training process.

8. The SOP estimation system of claim 7, wherein the training using the sequence training process enables the battery voltage estimation model to be trained from a discontinuous dataset, which thereby increases an accuracy of the battery voltage estimation model.

9. The SOP estimation system of claim 1, wherein the search process includes, for each iteration:

applying a different power pulse to the trained battery voltage estimation model to determine an estimated voltage of the battery system;

determine whether the estimated voltage of the battery system falls within the desired voltage range corresponding to an acceptable error tolerance; and when the estimated voltage of the battery system does not fall within the desired voltage range, increasing or decreasing the power pulse for a next iteration.

10. The SOP estimation system of claim 1, wherein the control system is not configured to utilize, for SOP estimation of the battery system, either (i) a characteristic mapping method or (ii) an equivalent circuit model (ECM) or electrochemical model for the battery system.

11. A state of power (SOP) estimation method for an electrified vehicle, the SOP estimation method comprising:

accessing, by a control system of the electrified vehicle, a trained battery voltage estimation model configured to estimate a voltage of a battery system of the electrified vehicle based on a set on input parameters including at least state of charge (SOC), temperature, and power or current;

performing, by the control system, a search process to determine a final estimated SOP that causes the estimated voltage of the battery system to fall within a desired voltage range; and controlling, by the control system, the electrified vehicle based on the final estimated SOP of the battery system.

12. The SOP estimation method of claim 11, wherein the trained battery voltage estimation model is a long short-term memory (LSTM) based recurrent neural network model.

13. The SOP estimation method of claim 12, wherein the search process is a binary search process.

14. The SOP estimation method of claim 13, wherein the trained battery voltage estimation model is obtained by training a battery voltage estimation model using a sequence training process.

15. The SOP estimation method of claim 14, wherein the trained battery voltage estimation model includes two hidden LSTM layers each having sixteen hidden units.

16. The SOP estimation method of claim 11, wherein the search process is a binary search process.

17. The SOP estimation method of claim 11, wherein the trained battery voltage estimation model is obtained by training a battery voltage estimation model using a sequence training process.

18. The SOP estimation method of claim 17, wherein the training using the sequence training process enables the battery voltage estimation model to be trained from a discontinuous dataset, which thereby increases an accuracy of the battery voltage estimation model.

19. The SOP estimation method of claim 11, wherein the search process includes, for each iteration:

applying a different power pulse to the trained battery voltage estimation model to determine an estimated voltage of the battery system;

determine whether the estimated voltage of the battery system falls within the desired voltage range corresponding to an acceptable error tolerance; and when the estimated voltage of the battery system does not fall within the desired voltage range, increasing or decreasing the power pulse for a next iteration.

20. The SOP estimation method of claim 11, wherein the control system is not configured to utilize, for SOP estimation of the battery system, either (i) a characteristic mapping method or (ii) an equivalent circuit model (ECM) or electrochemical model for the battery system.

* * * * *